Dec. 22, 1953   R. K. FARRINGTON ET AL   2,663,536
GRAVITY SUSPENSION HANGER
Filed Sept. 15, 1950   2 Sheets-Sheet 1
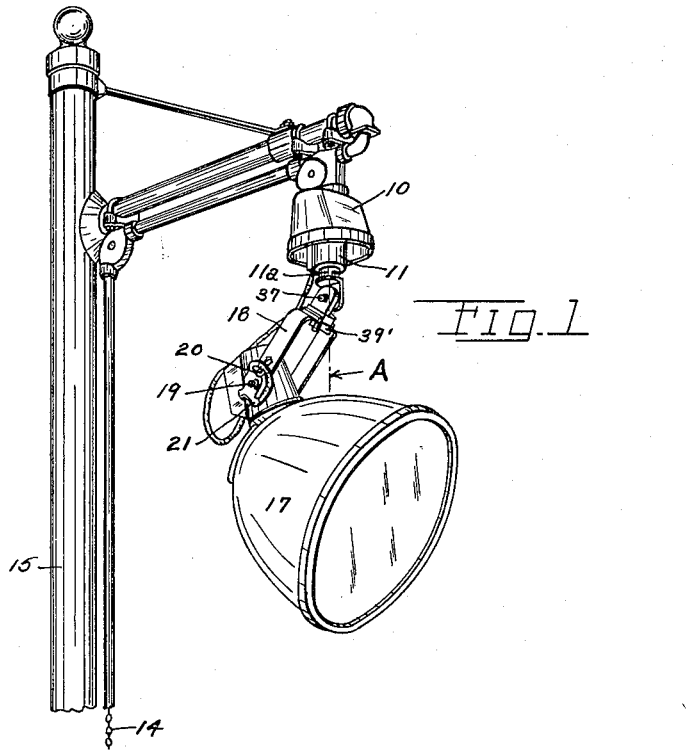
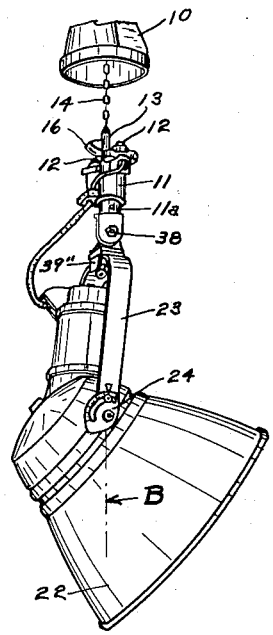
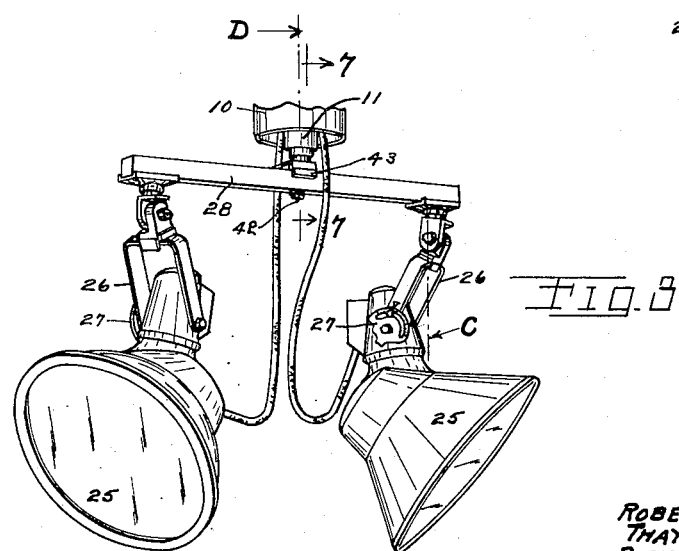
INVENTORS.
ROBERT K. FARRINGTON
THAYER B. FARRINGTON
RICHARD F. KURZENBERGER
BY Hyde, Meyer, Baldwin & Doran
ATTORNEYS Dec. 22, 1953  R. K. FARRINGTON ET AL  2,663,536
GRAVITY SUSPENSION HANGER
Filed Sept. 15, 1950  2 Sheets-Sheet 2
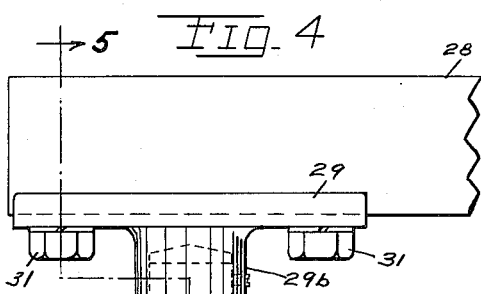
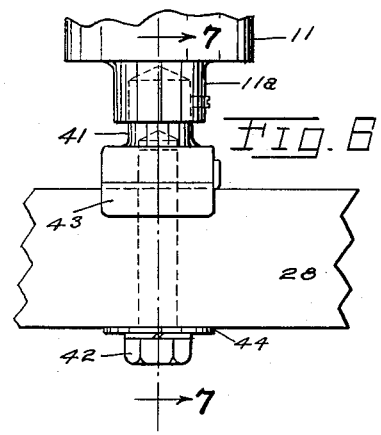
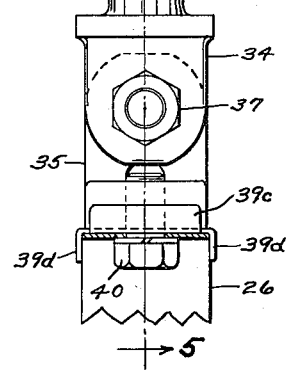
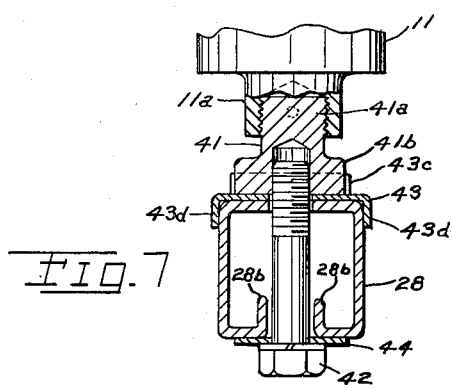
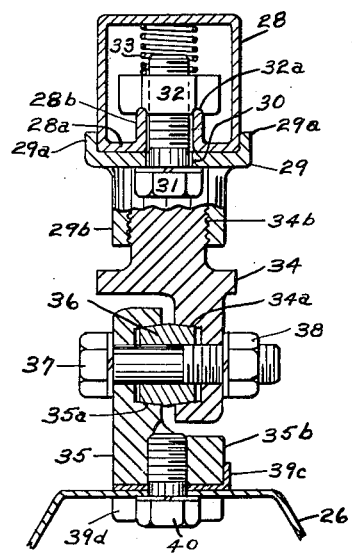
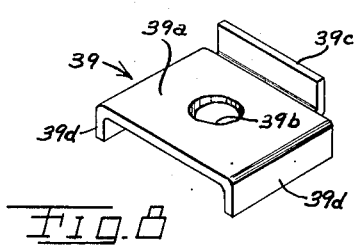
INVENTORS.
ROBERT K. FARRINGTON
THAYER B. FARRINGTON
RICHARD F. KURZENBERGER
BY Hyde, Meyer, Baldwin & Doran
ATTORNEYS

Patented Dec. 22, 1953

2,663,536

UNITED STATES PATENT OFFICE 2,663,536

GRAVITY SUSPENSION HANGER

Robert K. Farrington, Shaker Heights, Thayer B. Farrington, Cleveland Heights, and Richard F. Kurzenberger, Cleveland, Ohio, assignors to The Thompson Electric Company, Cleveland, Ohio, a corporation of Ohio Application September 15, 1950, Serial No. 184,955

5 Claims. (Cl. 248—320)

This invention relates to improvements in a gravity suspension hanger and more particularly to improvements in the suspension of lamps on a lowering hanger member adapted to be raised and lowered in conjunction with a fixed hanger member in an elevated location.

One of the objects of the present invention is to provide means for quickly adjusting the suspension of a lamp of the bail type so that the vertical line of a suspending cable or chain passes through the center of gravity of the lamp.

Another object of the present invention is to provide novel means for suspending a lamp having a bail suspension which may be set at various angles to the horizontal so as to throw the beam of the lamp where desired, including the feature of suspending the lamp by means passing through the center of gravity of the lamp so that it will not oscillate in a vertical plane when it is suspended.

A further object of the present invention is the suspension of a lamp of the type described in the preceding paragraph from a lowering hanger member which is provided with a vertical stem adapted to enter and latch itself to a vertical guide in a fixed hanger member, the passing of the suspension means through the center of gravity of the lamp aiding in holding the stem always in a vertical position so that it latches itself easily and efficiently when raised.

Another object of the present invention is to provide two or more lamps on opposite sides of a flexible tension suspension member with means for adjusting the lamps toward or away from the axis of suspension so as to balance the lamp on one side of the axis against a lamp on the opposite side so as to maintain the balance of the lowering member.

Still another object of the present invention is to provide an adapter member utilizable with my lamp suspension means so that by merely changing the adapter, the equipment may be accommodated to bails of varying width.

Other objects and advantages of the invention will be apparent from the accompanying drawings and description and the essential features will be set forth in the appended claims.

In the drawings—

Fig. 1 is a perspective view of one form of bail type lamp using our novel suspension means and in raised latched position connected with a fixed hanger member;

Fig. 2 is a fragmental perspective view of another type of lamp provided with our improved suspension means and showing the lowering hanger member partially lowered out of its latched position with a upper fixed hanger member;

Fig. 3 is a fragmental perspective view showing two lamps of still a different type utilizing our improved suspension means and mounted on opposite sides of the suspension axis by means of a beam along which the lamps are adjustable;

Fig. 4 is a fragmental elevational view enlarged taken near the left end of the suspension beam of Fig. 3;

Fig. 5 is a transverse sectional view taken along the line 5—5 of Fig. 4;

Fig. 6 is a fragmental elevational view enlarged taken near the center of the suspension beam of Fig. 3;

Fig. 7 is a transverse sectional view taken along the line 7—7 of Fig. 6 and taken along the line 7—7 of Fig. 3 and enlarged; while Fig. 8 is a perspective view of an adapter shown in others of the views.

It will be recognized by those familiar with this art that our invention is useful in any case where a lamp having a bail suspension is adapted to be set at various angles to the horizontal so as to throw the beam of the lamp where desired, after which the setting of the bail is fixed, and wherein this lamp is raised and lowered in the course of its use. By this construction, the lamp when in its raised position directs its beams where they are intended and the lamp may be lowered for cleaning and maintenance and again raised to its operative position without changing this adjustment of beam angle. While our invention is useful in many types of lowering hanger fixtures, we have chosen to show the same utilizing a suspension similar to that shown in United States Patent No. 2,403,355, granted July 2, 1946, to Thayer B. Farrington et al. In this type of hanger, as shown in Figs. 7 and 9 of the above mentioned Farrington et al. patent, a fixed hanger member 10 in a raised location carries fixed electrical contacts and a stem guide and latching mechanism whereas a lowering hanger member 11 is provided with a pair of contacts 12 adapted to engage with the upper fixed contacts when the lowering hanger member is in raised position as shown in Fig. 1 of the present drawings. At the same time, the lowering hanger member carries a stem 13 in a vertical position and connected with a chain or cable 14 which passes over suitable pulleys and then generally downwardly along side of a vertical supporting member 15 as shown in Fig. 1. This brings the chain or cable 14 to the ground or to a roof or other surface upon which the operator stands. A dog 16 is pivotally mounted at one side of the stem 13 and is adapted to latch the lowering hanger member to the upper or fixed hanger member when the parts are in the position of Fig. 1. The details of this stem and guide together with the latch and dog are clearly shown in United States Patent No. 2,377,871 granted to Thayer B. Farrington et al. on June 12, 1945. The present invention is particularly adapted for use with this type of hanger where it is important that the stem 13 should remain in a vertical direction at all times so that it will properly enter the receiving guide and so that the parts may be properly latched together when the lamp is raised.

In Figs. 1, 2 and 3, we have shown three different types of lamps as illustrative of the use of our invention. In the lamp 17 of Fig. 1, the bail 18 is oscillatable about a pivot 19 on the lamp base and is adapted to be fixed in any one of various adjusted positions by tightening the nut 20 on a bolt which moves in the arcuate bracket 21. This lamp when adjusted to direct the beam as shown in Fig. 1 and when suspended according to our invention so that the lamp is balanced about the axis of suspension A, this axis of suspension passes through the forward portion of the lamp reflector well ahead of the lamp base. The lamp 22 of Fig. 2 is of a different type but has a bail 23 which is adjustably mounted in the same fashion as the lamp of Fig. 1, as indicated at 24. This lamp when so fixed and adjusted to direct the beam of light as shown in Fig. 2 has the axis of suspension B passing through the lamp near the base thereof and fairly close to the pivot 24 so that the bail 23 extends in a generally vertical direction when the lamp is in balance about the axis of suspension B. The lamp 25 of Fig. 3 has a bail 26 which is adjustable to various positions relative to the lamp by means of the bracket 27. In this case, the lamp, when balanced, has the axis of suspension indicated at C passing through a point on the lamp which is intermediate the positions shown in Figs. 1 and 2. In other words, no matter what the distribution of weight in the lamp itself and no matter what angle the bail is set relative to the lamp, our invention provides means for suspending the lamp so that the axis of suspension passes through the center of gravity of the lamp. Thus, there is no tendency of the lamp to oscillate in a vertical plane as it is raised and lowered.

In the device of Fig. 3, two lamps 25 are suspended from a beam 28 on opposite sides of an axis of suspension D which represents the line of the chain or cable passing through the fixed hanger member 10 and connected to the stem of the lowering hanger member 11. Since the suspension of the two lamps is the same, one only will be described. Referring to Figs. 4 and 5, a bracket 29 is provided with spaced openings 30 through which pass bolts 31. The beam 28 is generally channel shape in section opening downwardly and the bottom wall of the channel has inwardly turned flanges 28a which again turn upwardly at 28b parallel to the side walls of the beam. This section of beam 28 is constant throughout its length. Each bracket 29 has parallel upturned side flanges 29a which embrace the side walls of the channel 28 as shown in Fig. 5. Each bolt 31 passes upwardly through the opening 30 in bracket 29, then between the flange portions 28b of the beam 28, where the bolt is threaded into a nut 32 which has parallel troughs 32a which receive the upper edges of the flange portions 28b so that the nut 32 is kept from turning. A helical spring 33 held between the nut and the top wall of beam 28 resiliently holds the nut 32 when adjustments are made. By this construction, the bolts 31 may be loosened while the bracket 29 is moved along beam 28 toward or away from the axis of suspension D so as to balance the lamps on opposite sides of this axis. Of course, where the lamps 25 of Fig. 3 are of same or similar weight, they will be at about the same distance from the axis of suspension D. However, if one of these lamps were heavier, it would have to be moved nearer the axis of suspension in order to balance the fixture about the axis D.

For permitting one of the lamps 17, 22 or 25 to seek a position of balance where the center of gravity of the lamp is on the axis of suspension, we have made use of a fitting which is fully disclosed and claimed in the copending application of Robert K. Farrington et al., Serial No. 89,932, filed April 27, 1949. This fixture, as best seen in Fig. 5, provides an upper member 34 having a frusto-conical recess 34a and having a threaded end 34b adapted to be threaded into a central socket 29b of the bracket 29. A lower member 35 is provided with a frusto-conical recess 35a and a square end 35b for attachment to the bail of a lamp. A plug 36 having two frusto-conical ends back to back is adapted to enter snugly into recesses 34a and 35a because the conical shape of these interfitting parts are arranged at corresponding angles. A bolt 37 passes through the fittings 34 and 35 and through the center of plug 36. A nut 38 holds these parts together. When a lamp is to be suspended using these parts 34, 35 and 36, its bail is first adjusted at a suitable angle relative to the lamp itself so that the lamp when suspended will direct its light beam as desired. The parts are then suspended with the nut 38 loosened on the bolt 37. The parts 34 and 35 will then oscillate relative to each other until the axis of suspension A, B or C passes through the center of gravity of the lamp. Then the nut 38 is tightened so that plug 36 frictionally grips in the recesses 34a and 35a.

The adapter 39 of Fig. 8 is utilized to secure the lower end of fixture 35 to the bail of a lamp. The adapter has a planar central portion 39a through which is a central opening 39b adapted to receive a bolt. Turned upwardly generally at right angles to the plane of the portion 39a is a lip 39c adapted to keep the parts from relative rotation. Turned downwardly from the central portion 39a at approximately right angles are a pair of parallel flanges 39d which are at right angles to the lip 39c. As viewed in Figs. 4 and 5, the lip 39c rests against the square base 35b of the fixture 35 to keep the parts from turning. The flanges 39d snugly embrace opposite sides of the lamp bail 26. A bolt 40 is passed upwardly through the opening 39b and threaded into the fixture 35 as clearly shown in Figs. 4 and 5. This holds the parts assembled. It will be obvious, that by supplying another adapter wherein the flanges 39d have a different spacing, lamp bails 18, 23 and 26 of differing widths can be easily accommodated by merely changing the cheap adapter part shown in Fig. 8.

The means for suspending the beam 28 from the lowering hanger member 11 as shown in Fig. 3 is more clearly defined in Figs. 6 and 7. A fixture 41 is provided with a threaded end 41a which is received in a threaded socket in the lowering hanger member 11. The member 41 has a square base 41b which has a central threaded opening for receiving a bolt 42. An adapter 43 constructed according to Fig. 8 has a lip 43c which engages against the square base 41b and has parallel downturned flanges 43d which embrace opposite sides of the beam 28. A washer 44 spans the opening between flanges 28b in the bottom of the beam so that bolt 42 may be drawn up tightly to hold the parts in the positions shown in Figs. 3, 6 and 7.

The structures shown in Figs. 1 and 2 for connecting bails 18 or 23 to the lowering hanger member 11 are exactly like the parts 34, 35, 36 and 37 described in connection with Figs. 4 and 5. The threaded end 34b of the member 34 is threaded directly into the lowering hanger portion 11a just as the threaded end 41a is threaded into the end 11a of the hanger member 11 in Fig. 7. To adjust lamps 17 or 22 so that the axis of suspension A and B respectively pass through the center of gravity of the lamps, the same procedure is used as that previously described. The lamp bail 18 or 23 is first set at the desired angle with respect to the base of the lamp after which the nut 38 on bolt 37 is loosened and the lamp is allowed to assume a position of balance after which the nut 38 is tightened. The adapters 39' of Fig. 1 and 39'' of Fig. 2 are exactly like the adapter 39 of Figs. 5 and 8 except that the spacing between the flanges 39d of Fig. 8 is made to snugly embrace the bails 18 and 23 respectively.

What we claim is:

1. In combination, a bail for suspending an article, means for holding said bail fixed relative to said article at various adjustable angles, means for suspending said bail from overhead including a flexible tension member defining an axis of suspension, two fixtures and releasable securing means connecting them for relative oscillation into any angular position in a zone of oscillation, said fixtures and securing means including a horizontal pivot as an axis for said oscillation, one of said fixtures being attached to said tension member, the other of said fixtures being attached to said bail, and said securing means adapted to secure said fixtures firmly together with the axis of suspension of said tension member passing through the center of gravity of said article.

2. The combination of claim 1 wherein said means for suspending said bail from overhead comprises fixed and lowering hanger members, one of said fixtures secured to said lowering hanger member, said lowering hanger member comprising a stem adapted to enter said fixed hanger member only when said stem is approximately vertical, and said tension member connected to the top of said stem.

3. Suspension means for a plurality of articles comprising a beam, a flexible tension member secured to said beam between its ends, an article on each side of said tension member, a bail for suspending each article, means for holding each bail fixed relative to its associated article at various adjustable angles, means mounting each bail on said beam, each said mounting means comprising two fixtures and releasable securing means connecting them for relative oscillation into any angular position in a zone of oscillation, one of said fixtures secured to said beam, the other of said fixtures secured to one of said bails, said securing means including a horizontal pivot and means for holding said fixtures firmly together with said pivot vertically above the center of gravity of said article.

4. The combination of claim 3 wherein said means mounting each bail on said beam comprises parts movable lengthwise of said beam, and means for fixing said parts to said beam, whereby said articles may be moved toward or away from said tension member to balance said articles on said beam.

5. An adapter for connecting a square member having a flat face to an elongated member having a flat face and parallel sides, said adapter having a rectangular planar portion having a central through opening to receive a bolt, a lip extending at right angles to one face of said planar portion along one side thereof, and parallel flanges extending at right angles to the other face of said planar portion along two sides of said planar portion normal to said one side.

ROBERT K. FARRINGTON.
THAYER B. FARRINGTON.
RICHARD F. KURZENBERGER.

References Cited in the file of this patent
UNITED STATES PATENTS

| Number | Name | Date |
|---|---|---|
| 732,411 | Hughes | June 30, 1903 |
| 767,642 | Hart | Aug. 16, 1904 |
| 782,418 | Rogers | Feb. 14, 1905 |
| 2,377,871 | Farrington et al. | June 12, 1945 |
| 2,403,355 | Farrington et al. | July 2, 1946 |
| 2,433,314 | White | Dec. 23, 1947 |
| 2,465,519 | Eastman | Mar. 29, 1949 |